United States Patent
Lin et al.

(10) Patent No.: US 8,209,452 B2
(45) Date of Patent: Jun. 26, 2012

(54) EXTERNAL DEVICE HAVING A VIRTUAL STORAGE DEVICE

(75) Inventors: Liang-Chun Lin, Hsinchu (TW); Cheng-Sheng Chan, Hsinchu (TW)

(73) Assignee: Prolific Technology Inc., Nan Kang, Taipei (TW)

( * ) Notice: Subject to any disclaimer, the term of this patent is extended or adjusted under 35 U.S.C. 154(b) by 116 days.

(21) Appl. No.: 12/365,175

(22) Filed: Feb. 4, 2009

(65) Prior Publication Data
US 2010/0125688 A1    May 20, 2010

(30) Foreign Application Priority Data

Nov. 17, 2008   (TW) ................. 97144344 A

(51) Int. Cl.
*G06F 13/12* (2006.01)
*G06F 13/38* (2006.01)
*G06F 12/00* (2006.01)
*G06F 21/00* (2006.01)
*G06F 9/26* (2006.01)
*G06F 9/34* (2006.01)

(52) U.S. Cl. ............... 710/74; 711/6; 711/203
(58) Field of Classification Search .............. None
See application file for complete search history.

(56) References Cited

U.S. PATENT DOCUMENTS

| | | | | |
|---|---|---|---|---|
| 2007/0043889 | A1* | 2/2007 | Sanada et al. | 710/62 |
| 2007/0260839 | A1* | 11/2007 | Arndt | 711/165 |
| 2007/0277015 | A1* | 11/2007 | Kalos et al. | 711/170 |
| 2008/0098023 | A1* | 4/2008 | Araki et al. | 707/101 |
| 2008/0140824 | A1* | 6/2008 | Jain et al. | 709/224 |
| 2008/0270733 | A1* | 10/2008 | Sakaguchi et al. | 711/173 |
| 2009/0193184 | A1* | 7/2009 | Yu et al. | 711/103 |

FOREIGN PATENT DOCUMENTS

| | | |
|---|---|---|
| CN | 2679742 Y | 2/2005 |
| CN | 1945521 | 4/2007 |
| TW | 200842689 | 11/2008 |

* cited by examiner

*Primary Examiner* — Henry Tsai
*Assistant Examiner* — Kris Rhu
(74) *Attorney, Agent, or Firm* — Winston Hsu; Scott Margo

(57) ABSTRACT

An external device includes a bridge and a storage device. The bridge is connected to a host according to a first data transmission interface so as to convert data of the host from the first data transmission interface to a second data transmission interface. The bridge includes a memory unit and a control unit. The memory unit stores a virtual device datum. The control unit generates a virtual storage device in the host according to the virtual device datum. The storage device is connected to the bridge for storing the data of the host according to the second data transmission interface.

8 Claims, 4 Drawing Sheets

EXTERNAL DEVICE HAVING A VIRTUAL STORAGE DEVICE

BACKGROUND OF THE INVENTION

1. Field of the Invention

The present invention relates to an external device, and more particularly, to an external device capable of generating a virtual storage device in a computer host.

2. Description of the Prior Art

For expanding the function of the computer system and adapting the requirement of the users, different external devices of the computer are developed. For example, external hard disk or portable storage device can expand the limited storage capacity of the computer system. The external CD-ROM drive or CD-RW drive can expand the function of the computer system accessing the multimedia resource and provide the capability to backup large data. The storage device needs to use a medium device (or a bridge) to communicate with the computer system and transmit data.

Please refer to FIG. 1. FIG. 1 is a block diagram of an external device connected to a computer host according to the prior art. The external device 15 connected to the host 11 receives and stores the data from the host 11. The external device includes a bridge 151 and a storage device 152. The bridge 151 is connected between the host 11 and the storage device 152, for providing a data transmission interface so that the host 11 and the bridge 151 can transmit data according to a first data transmission interface, and the bridge 151 and the storage device 152 can transmit data according to a second data transmission interface. Thus, the data from the host 11, through the bridge 151, can be converted to the data capable of the data transmission with the storage device 152. In addition, the bridge 151 includes a control unit 153 for controlling the operation of the bridge 151 according to the commands of the host 11 and performing the data transmission. The storage can be a hard disk. The storage device is connected to the computer host through the bridge. The bridge is in charge of the signal conversion between the storage device and the computer host. For the computer host, the bridge and the storage device form an external storage device. The bridge can generate an external virtual device through the firmware design, and this virtual device can be a CD-ROM drive. Thus, the computer host will have the virtual storage device besides the real storage device, but actually there is one real external storage device.

The external device in use at present, to generate one virtual storage device or a plurality of virtual storage devices, has to store the virtual device data in the storage device. In this way, the storage capacity of the storage device is decreased, and the data are read in the specific method. The virtual device data stored in the storage device occupies the storage space of the storage device so the user obtains less storage capacity. Moreover, the user may damage the file structure of the storage device when using the physical storage device through other different bridges or on other computer systems.

SUMMARY OF THE INVENTION

According to an embodiment of the present invention, an external device comprises a bridge and a storage device. The bridge is used for connecting to a host according to a first data transmission interface so as to converting data of the host from the first data transmission interface to a second data transmission interface. The bridge comprises a memory unit and a control unit. The memory unit is used for storing a virtual device data. The control unit is used for generating a virtual storage device in the host according to the virtual device data. The storage device is connected to the bridge, for storing the data of the host according to the second data transmission interface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
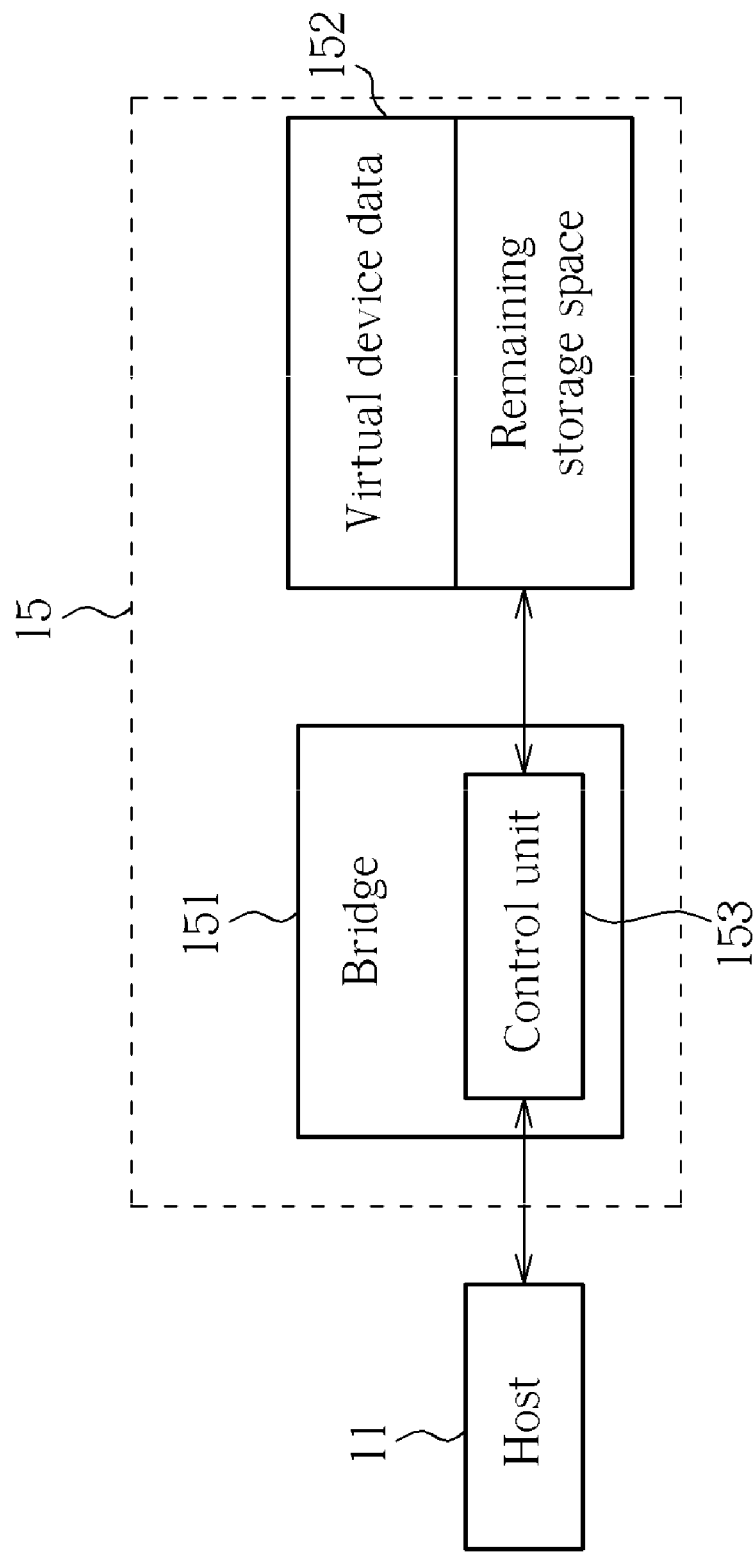
FIG. 1 is a block diagram of an external device connected to a computer host according to the prior art.
Figure 2:
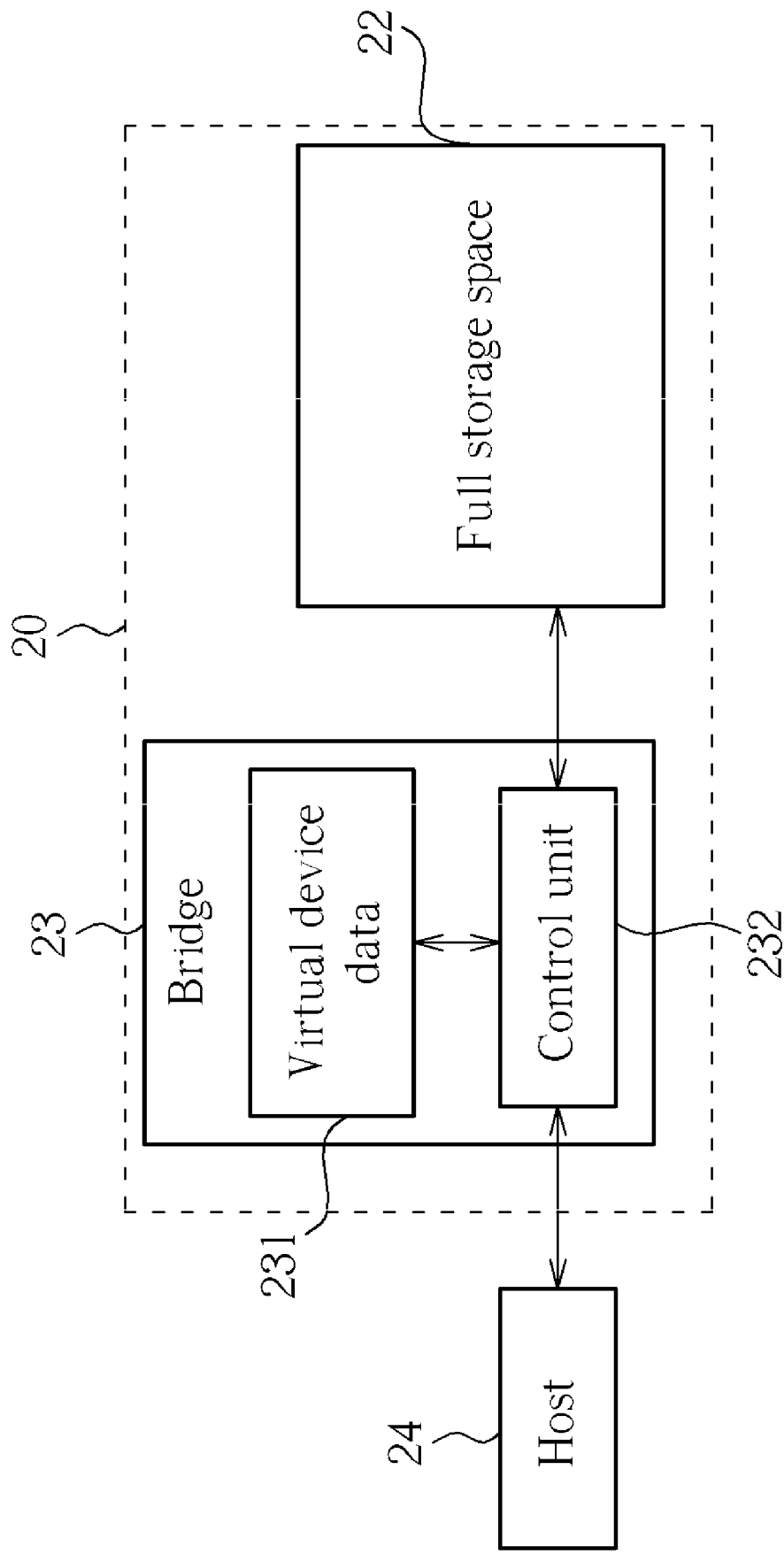
FIG. 2 is a block diagram of the first embodiment of an external device connected to a computer host according to the present invention.

Please refer to FIG. 2. FIG. 2 is a block diagram of the first embodiment of an external device connected to a computer host according to the present invention. The external device 20 comprises a storage device 22 and a bridge 23. The bridge 23 connects to a host 24 according to a first data transmission interface, and determines if the data of the host 24 belongs to the physical storage device 22. If it does, the bridge 23 converts the first data transmission interface to a second data transmission interface, and then stores the data of the host 24 in the storage device 22 according to the second data transmission interface. The first data transmission interface comprises Universal Serial Bus (USB) interface, IEEE1394 interface, or External Serial ATA (eSATA) interface. The second data transmission interface comprises Integrated Device Electronics (IDE) interface, Serial ATA (SATA) interface, or Small Computer System Interface (SCSI). The bridge 23 comprises a memory unit 231 and a control unit 232. The memory unit 231 stores a virtual device data. The virtual device data comprises drivers, all kinds of application programs, or all kinds of data. The control unit 232 is connected the memory unit 231, for controlling the operation of the memory unit 231 and performing the data transmission.

The external device 20 according to the present invention stores the virtual device data in the memory unit 231 of the bridge 23, so the storage device 22 provides the full storage capacity of the physical storage device for the user and avoids data damage of the external device when using the physical storage device through other different bridges or on other computer systems. Taking the virtual CD-ROM drive for example, when the external device 20 is connected to the host 24, the control unit 232 can read the virtual device data stored in the memory unit 231 and generates a virtual CD-ROM drive in the operating system of the host 24. In addition, the operating system of the host 24 can use the auto-run function of the CD-ROM to execute the drivers, all kinds of application programs, and all kinds of data stored in the memory unit 231 for the virtual CD-ROM. In this embodiment, the storage device 22 can be a hard disk, CD-ROM drive, or flash memory. The memory unit 231 can be a flash memory, EEPROM or other small-scale memory. The virtual storage device can be a hard disk, CD-ROM drive or portable memory.

Figure 3:
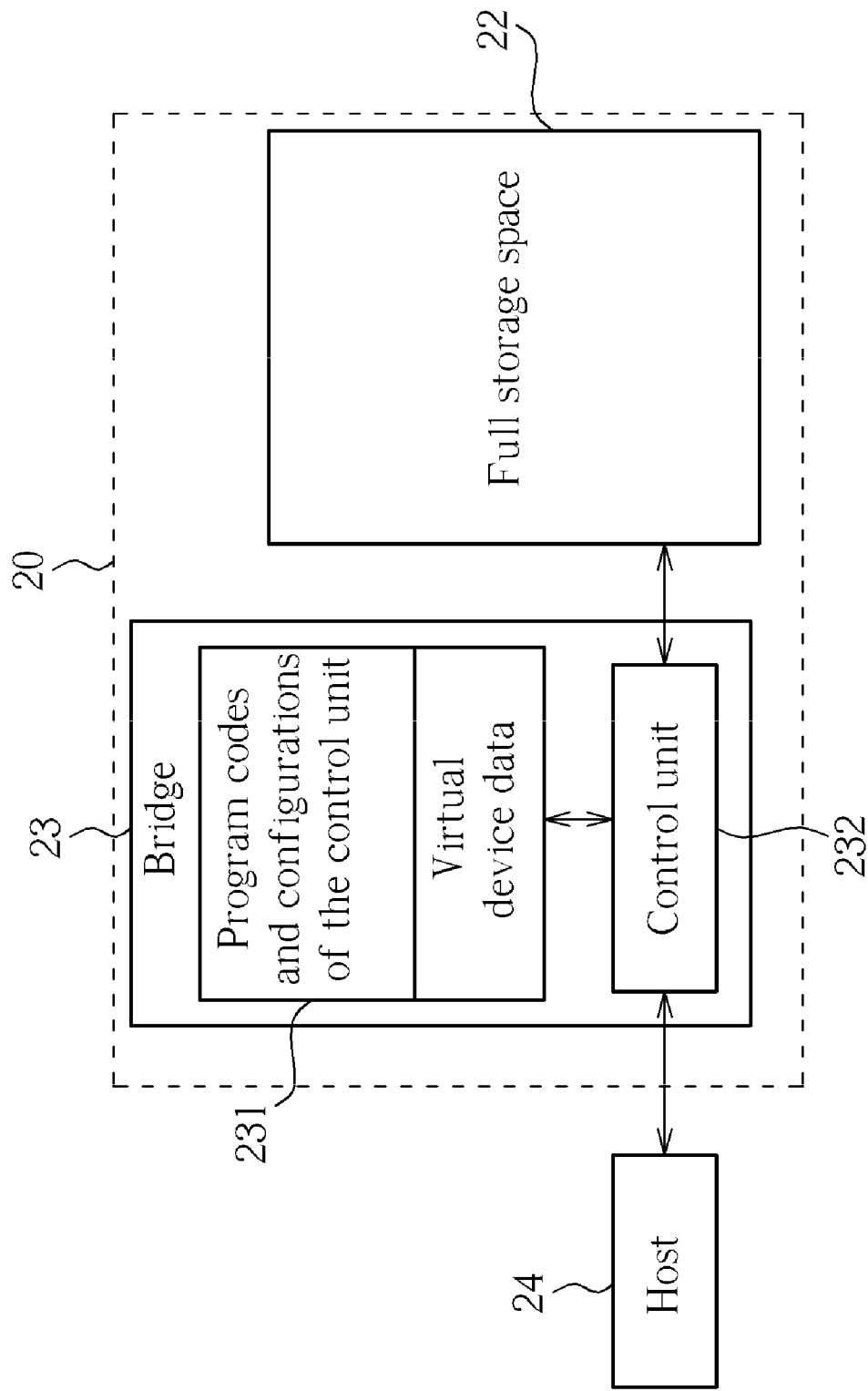
FIG. 3 is a block diagram of the second embodiment of an external device connected to a computer host according to the present invention.

Please refer FIG. 3. FIG. 3 is a block diagram of the second embodiment of an external device connected to a computer host according to the present invention. In this embodiment, the memory unit 231 can store the program codes and the configurations of the control unit 232. In general, the bridge generates the virtual storage device for some specific applications, so the program codes for the different functions and the related configurations of the control unit 232 are stored in the memory unit 231 of the bridge according to different requirements. When the external device is started, the functions of the external device can be determined according to the program codes stored in the memory unit 231. In addition, the program codes of the control unit 232 can determine if the virtual storage device and the storage device are connected to the host 24.

Figure 4:
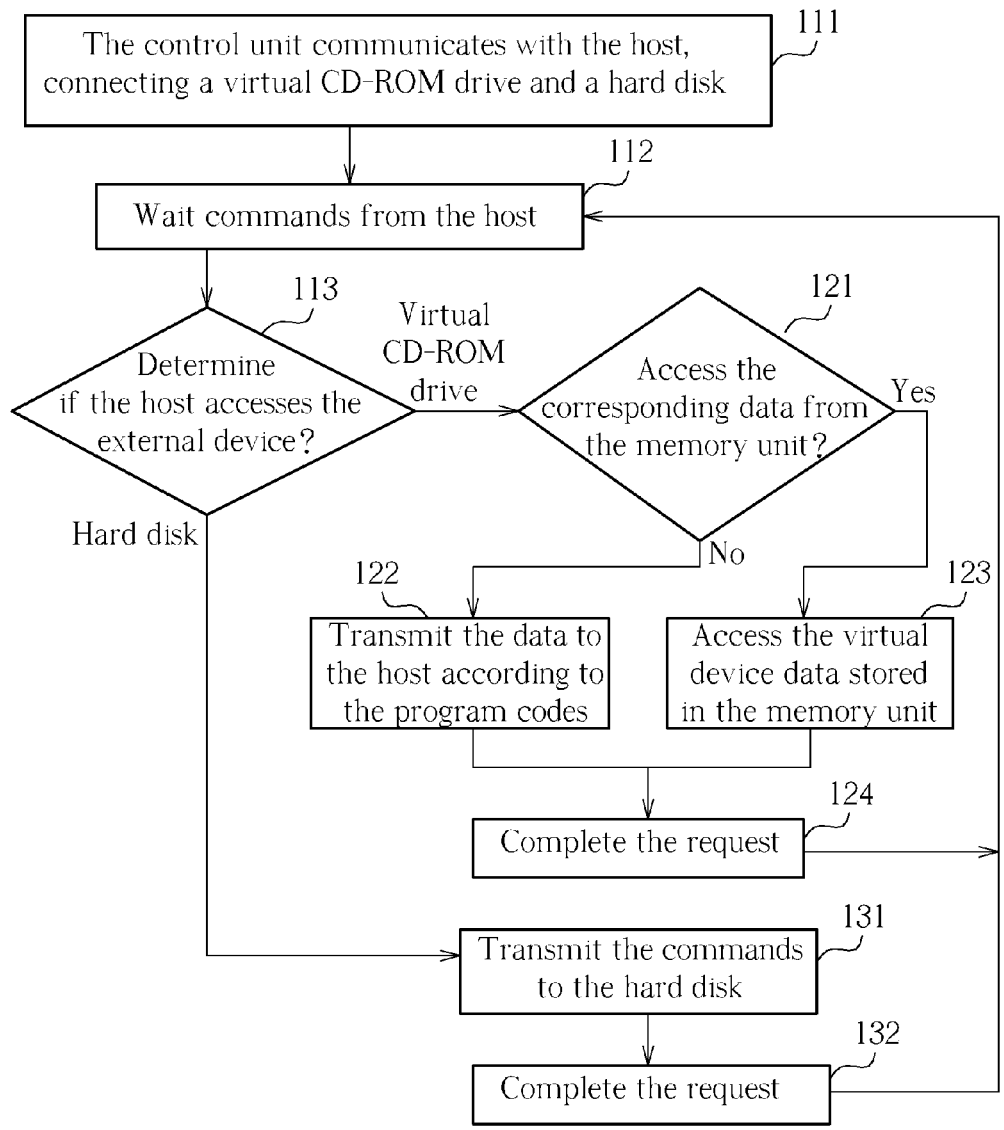
FIG. 4 is a flow chart of the external device communicating with the computer host according to the present invention.

Please refer to FIG. 4. FIG. 4 is a flow chart of the external device communicating with the computer host according to the present invention. The communication between the external device and the computer host comprises the following steps:

Step 111: After reading the program codes and the configurations of the control unit, the control unit communicates with the host. The control unit will inform the host of two storage device existing, for example, a virtual CD-ROM drive and a hard disk.

Step 112: The control unit waits the commands from the host.

Step 113: The control unit determines if the host accesses the external device. When the host transmits the commands to access the virtual CD-ROM drive, go to the step 121; when the host transmits the commands to access the hard disk, go to the step 131.

Step 121: The control unit determines if the host accesses the corresponding data from the memory unit according to the program. If the host does not access the corresponding data from the memory unit, go to the step 122; if the host needs to access the corresponding data from the memory unit, go to the step 123.

Step 122: The control unit transmits the data to the host according to the program codes, and then go to the step 124.

Step 123: The control unit accesses the virtual device data stored in the memory unit and transmits them to the host, and then go to the step 124.

Step 124: The control unit completes the request from the host, and waits the next commands.

Step 131: The control unit transmits the commands to the hard disk and wait that the hard disk responses to the commands of the host, and then go to the step 132.

Step 132: The control unit completes the request from the host, and waits the next commands.

In conclusion, the external device of the present invention comprises a bridge and a storage device. The bridge is connected to a host according to a first data transmission interface so as to convert data of the host from the first data transmission interface to a second data transmission interface. The bridge comprises a memory unit and a control unit. The memory unit stores a virtual device datum. The control unit generates a virtual storage device in the host according to the virtual device datum. The storage device is connected to the bridge for storing the data of the host according to the second data transmission interface. Since the virtual storage datum is stored in the memory unit of the bridge, the storage device can provide the full storage capacity and prevent the file structure of the storage device from damaging.

Those skilled in the art will readily observe that numerous modifications and alterations of the device and method may be made while retaining the teachings of the invention.

What is claimed is:

1. An external device, comprising:
    a bridge, for connecting to a host according to a first data transmission interface so as to convert data of the host from the first data transmission interface to a second data transmission interface, the bridge comprising:
        a memory unit, for storing a virtual device data; and
        a control unit, for generating the virtual storage device in the host according to the virtual device data, wherein the virtual storage device is a hard disk or a CD-ROM drive; and
    a storage device, connected to the bridge, for storing the data of the host according to the second data transmission interface;
    wherein the virtual device data is stored only in the memory unit and not stored in the storage device.

2. The external device of claim 1, wherein the control unit accesses the virtual storage device or the storage device according to commands of the host.

3. The external device of claim 1, wherein the control unit reads data of the virtual storage device or data returned by programming codes according to commands of the host.

4. The external device of claim 1, wherein the storage device is a hard disk, a CD-ROM drive, or a flash memory.

5. The external device of claim 1, wherein the memory unit further stores drivers or application programs.

6. The external device of claim 1, wherein the memory unit further stores program codes and configurations of the control unit.

7. The external device of claim 1, wherein the first data transmission interface is USB interface, IEEE1394 interface, or External Serial ATA (eSATA) interface.

8. The external device of claim 1, wherein the second data transmission interface is IDE interface, SATA interface, or SCSI interface.

* * * * *